United States Patent [19]

Ralph

[11] Patent Number: 4,718,449

[45] Date of Patent: Jan. 12, 1988

[54] FLOAT OPERATED VALVE ASSEMBLY WITH WEIGHTED BODY

[76] Inventor: George S. Ralph, 86621 Lorane Hwy., Eugene, Oreg. 97405

[21] Appl. No.: 940,804

[22] Filed: Dec. 12, 1986

[51] Int. Cl.[4] ............ F16K 31/26; F16K 33/00
[52] U.S. Cl. ................. 137/444; 119/80; 137/218; 137/436; 405/172
[58] Field of Search ......... 137/434, 442, 424, 425, 137/426, 444, 445, 429, 218, 436; 119/72, 78, 79, 80; 405/172

[56] References Cited

U.S. PATENT DOCUMENTS

| | | | |
|---|---|---|---|
| 1,574,755 | 3/1926 | Peterson | 119/78 |
| 2,635,622 | 4/1953 | Owens | 137/444 |
| 3,070,118 | 12/1962 | Antunez, Jr. | 137/436 |
| 3,145,728 | 8/1964 | Sterrett et al. | 119/78 |
| 3,145,729 | 8/1964 | Cordis | 119/78 |
| 3,232,637 | 2/1966 | Pennington et al. | 405/172 |
| 4,198,450 | 4/1980 | Hooykaas | 138/103 |

FOREIGN PATENT DOCUMENTS

| | | | |
|---|---|---|---|
| 112768 | 3/1941 | Australia | 119/78 |
| 1276468 | 6/1972 | United Kingdom | 138/103 |

Primary Examiner—George L. Walton
Attorney, Agent, or Firm—James D. Givnan, Jr.

[57] ABSTRACT

A valve assembly for placement within a water receptacle such as a trough without alteration of the receptacle. A weighted body of the valve assembly retains the assembly against displacement. A float is tethered to a valve actuating arm in a yieldable manner to avoid damage upon accidental float contact by cattle. The weighted body has a removable closure to permit the adding of heavy material immediately prior to valve use. A tubular base of the valve assembly is adapted at one end to receive a hose fitting.

5 Claims, 4 Drawing Figures

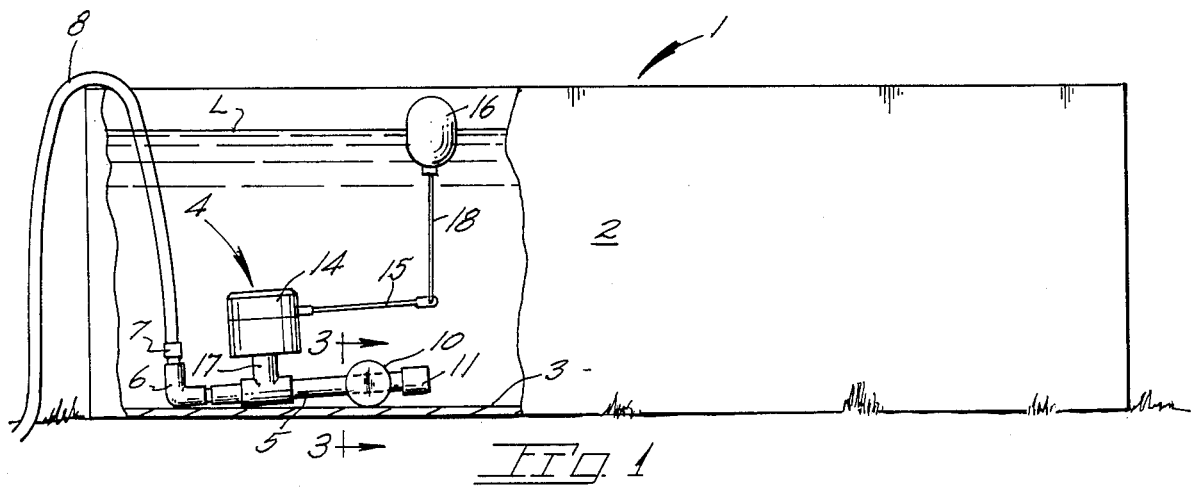
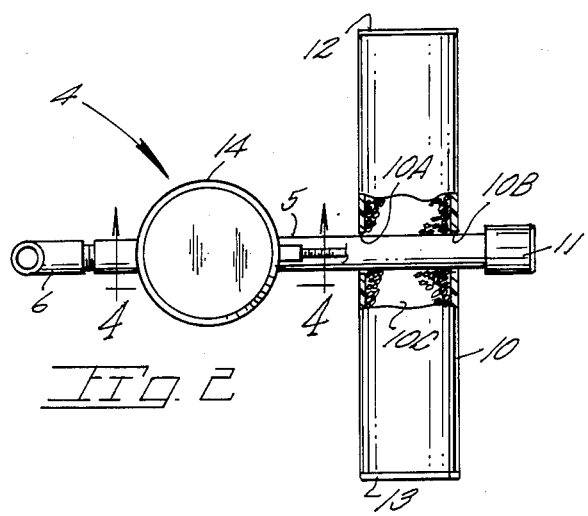
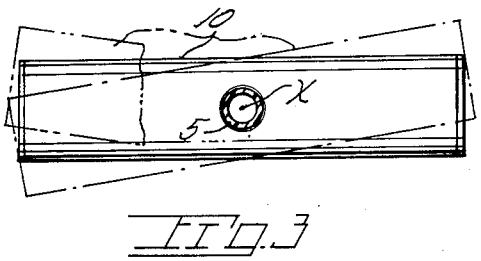
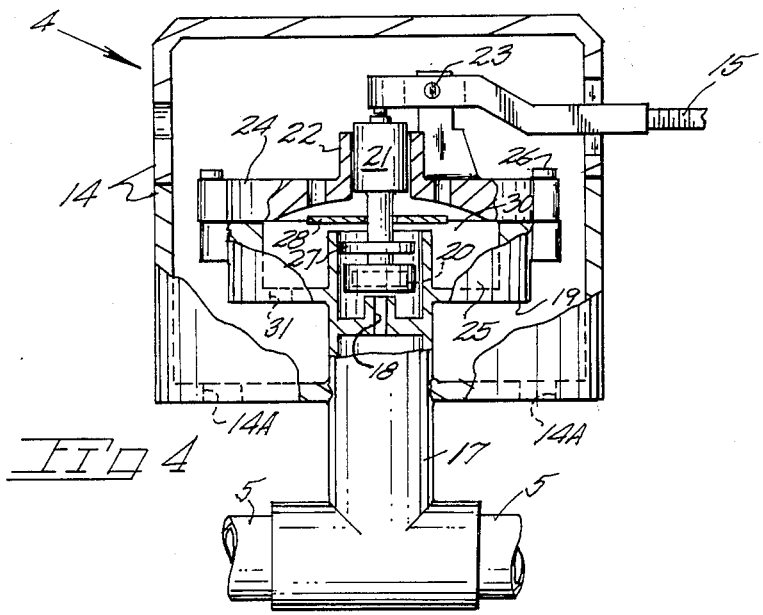

FLOAT OPERATED VALVE ASSEMBLY WITH WEIGHTED BODY

BACKGROUND OF THE INVENTION

The present invention concerns a valve assembly for placement within a receptacle to regulate a flow to effect a constant water level therein.

A problem exists in providing a regulated water flow to containers such as water troughs and tanks for cattle. Providing a continuous flow eventually results in the container overflowing or oppositely less than an adequate water supply. The installation of a valve assembly within such a trough or tank, using known valve assemblies, necessitates the modification of a trough or tank wall which is undesirable both from the installation effort required and to wall integrity rendering the container susceptible to leaking. Further, any maintenance effort required on a permanently mounted valve assembly requires draining of the container and perhaps detachment from a wall of the water receptacle. Known water control valves are susceptible to malfunction when used in water which may have debris therein, such as a stock watering tank.

U.S. Pat. No. 3,766,939 discloses a valve assembly intended for use in watering tanks but which requires securement to a wall structure which is undesirable for the reasons noted above. U.S. Pat. No. 4,274,365 discloses a valve and modified container which permits selective installation of the valve in a wall opening of the container to control water level height.

SUMMARY OF THE PRESENT INVENTION

The present invention is embodied within a valve assembly for rested placement upon the bottom wall of a watering trough or the like without alteration of same.

A base of the valve assembly serves to carry a valve body which is retained against the lifting action of a float by a weighted body on said base. The weighted body is adapted to receive, during valve assembly installation, a quantity of any high density particulate material. The weighted body is movable relative the base to permit placement of the valve assembly on horizontal or inclined tank surfaces. Said base is of tubular construction to receive a water flow from a flexible conduit and to communicate a flow to a valve body.

Important objectives of the present valve assembly include the provision of a valve assembly for maintaining a desired fluid level which may be deposited into a container, tank, trough, etc., without requiring modification of any wall structure; the provision of a valve assembly not susceptible to malfunctioning by reason of accidental contact by an animal or contamination by particles of debris in the water; the provision of a valve assembly which lends itself to low cost manufacture and shipping and which is conveniently installed by the user without the use of tools; the provision of a valve assembly which may be simply lifted out of a water container should the assembly require repair; the provision of valve assembly for placement on the bottom of a watering trough which to a great extend avoids damage from freezing.

BRIEF DESCRIPTION OF THE DRAWINGS

In the accompanying drawings:

FIG. 1 is a side elevational view of an animal watering trough with a wall broken away to disclose the present valve assembly;

FIG. 2 is a plan view of the assembly taken along line 2—2 of FIG. 1;

FIG. 3 is a vertical sectional view taken along line 3—3 of FIG. 1; and

FIG. 4 is a vertical sectional view taken along line 4—4 of FIG. 2.

DETAILED DESCRIPTION OF THE PREFERRED EMBODIMENTS

With continuing attention to the drawing wherein reference numerals indicate parts similarly hereinafter identified, the reference numeral 1 indicates generally a receptacle or reservoir for a quantity of water such as a watering tank or trough for livestock.

A receptacle or trough side wall at 2 is broken away to show a bottom wall at 3 which may be in ground engagement or supported in an elevated manner. A water level is at L.

In place within receptacle 1 is the present valve assembly indicated generally at 4. A base 5 of the assembly is of tubular construction with an elbow 6 at one end threaded to receive a water source such as a hose conduit 8 with an end fitting 7.

In place on base 5 is a weighted body 10 which serves to confine the remaining structure of the valve assembly in place against accidental displacement. Body 10 is of hollow construction to receive high density material such as gravel and is conveniently joined to the base as by body openings 10A and 10B through which the tubular base is inserted during assembly. A cap 11 prevents separation of the base and weighted body. One end of weighted body 10 is permanently closed by an end plate or plug 12 while a closure 13 is provided for installation by the user subsequent to charging of the interior 10C of weighted body 10 with high density material immediately prior to use of the valve assembly. The weighted body is preferably positionable about the major axis X of tubular base 5 as well as therealong to accommodate range of tank bottom wall installations both horizontal and inclined.

A valve body of the present valve assembly includes a two-piece housing 14 within which is valve structure which is open and closed by an arm 15 controlled by a float 16 yieldably tethered by a line 18. One suitable valve is that made by the Coast Foundry and Mfg. Co., and sold under the trademark Coast Master which valve is disclosed in U.S. Pat. No. 2,635,622, the patent disclosure herein incorporated by this reference. Such a valve is commonly used to regulate toilet tank water levels.

Housing 14 is supported in place by a pipe tee 17 in place on tubular base 5 with a pressurized flow of water being provided to the valve body via the upright portion of the Tee. Housing outlets are at 14A.

An orifice 18 of a valve body 19 is opened and closed by a washer 20 carried in an inverted cup of a plunger 21. The plunger slides within a collar 22 and is biased downwardly by arm 15 which moves about a pivot pin 23. Upper and lower valve components 24 and 25 of the valve are detachably secured to one another by fasteners 26. A pliable disc 28 serves as a baffle to direct an orifice discharge of water in an outward direction into a chamber 30 of the valve body 19. A plunger guide is at 27. Outlet ports are as at 31. It will be understood that while a particular valve body is disclosed other valve bodies may be utilized on tee 17 wherein a water flow is to be controlled by a float actuated arm.

In use, the present valve assembly is coupled to a hose conduit and placed on a tank bottom surface. Flexible line or tether 18 is then adjusted for length according to the water level height desired. Accidental contact of an animal with float 16 is of no consequence in view of the float tethered in a yieldable manner by line 18. With the valve assembly at rest on the bottom of the receptacle, damage from freezing is, to a large extent, avoided. The tubular base 5 supports the valve body housing 14 in an upright position as rotation of the base 5 is resisted by the action of float 16 as well as by the material within weighted body 10. If desired, said body may be secured to base 5 by a bonding agent.

While I have shown but one embodiment of the invention, it will be apparent to those skilled in the art that the invention may be embodied still otherwise without departing from the spirit and scope of the invention.

Having thus described the invention, what is claimed and desired to be secured in a Letters Patent is:

1. A float operated valve assembly for submerged deposit into a fluid receptacle, said valve assembly comprising,
 a tubular base for rested placement on the receptacle bottom,
 a weighted body on said base which supportably engages the receptacle bottom to confine the base body against upward movement,
 a valve body supported by said base in an offset manner while maintaining the valve body adjacent the receptacle bottom, said valve body being directly coupled to said based end in fluid communication with said base for regulating water flow into the receptacle, said valve body including outlet ports and an actuator arm,
 a float coupled to said valve actuator arm, and
 said base adapted to receive one end of a conduit to supply said valve body with a source of fluid.

2. The float operated valve assembly claimed in claim 1 wherein said weighted body is of hollow construction having attachable closure means to confine high density material therein.

3. The float operated valve assembly claimed in claim 1 wherein said base is of tubular configuration and fitted at one end with a hose coupling, said base additionally including a tee, said valve body carried by said tee.

4. The float operated valve assembly claimed in claim 1 wherein said weighted body is apertured for the inserted reception of said base.

5. The float operated valve assembly claimed in claim 1 additionally including a flexible line coupling said float to said actuator arm whereby momentary lateral displacement of the float will not result in displacement of the valve body.

* * * * *